US011801572B2

(12) United States Patent
Rasmussen et al.

(10) Patent No.: US 11,801,572 B2
(45) Date of Patent: *Oct. 31, 2023

(54) DUAL GAS PIERCE USING COAXIAL AND DIRECTIONAL ASSIST

(71) Applicant: Prima Power Laserdyne, LLC, Brooklyn Park, MN (US)

(72) Inventors: Chris Rasmussen, Zimmerman, MN (US); Mohammed Naeem, Derby (GB); Jacob Williams, Minneapolis, MN (US); Terence Schmidt, Little Canada, MN (US)

(73) Assignee: Prima Power Laserdyne, LLC, Brooklyn Park, MN (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/146,904

(22) Filed: Jan. 12, 2021

(65) Prior Publication Data
US 2021/0129266 A1    May 6, 2021

Related U.S. Application Data

(63) Continuation of application No. 15/792,207, filed on Oct. 24, 2017, now Pat. No. 10,926,353.

(51) Int. Cl.
*B23K 26/14*    (2014.01)
*B23K 26/142*    (2014.01)
(Continued)

(52) U.S. Cl.
CPC ........ *B23K 26/1476* (2013.01); *B23K 26/123* (2013.01); *B23K 26/142* (2015.10);
(Continued)

(58) Field of Classification Search
CPC .. B23K 26/142; B23K 26/382; B23K 26/123; B23K 26/1464; B23K 26/147;
(Continued)

(56) References Cited

U.S. PATENT DOCUMENTS

| 5,770,833 A | 6/1998 | Kanaoka |
| 6,204,475 B1 * | 3/2001 | Nakata ................ B23K 26/40 |
| | | 219/121.84 |

(Continued)

FOREIGN PATENT DOCUMENTS

| EP | 0985484 A2 | 3/2000 |
| EP | 1018395 A2 | 7/2000 |

(Continued)

OTHER PUBLICATIONS

European Examination Report, EPO Form 2906, EP Application No. 17198396.8, dated Mar. 14, 2023.

*Primary Examiner* — William J Levicky
*Assistant Examiner* — Adam M Eckardt
(74) *Attorney, Agent, or Firm* — Hinckley Allen & Snyder, LLP; Stephen Holmes

(57) ABSTRACT

A method and system is provided for laser piercing of thick plate material that allows for rapid transition to a cutting operation that can reliably produce a piercing hole and complete a cutting operation of the intended shape in a short time, while improving the cutting quality of the cutting after switching from the piercing operation. The cutting nozzle has a centrally located laser. The piercing operation applies a laser beam to the cut work while axially supplied pure oxygen gas is applied towards the cutting work. Additionally, a direction controlled nozzle adjacent the main cutting port provides a discharge of high pressure compressed air non-axially relative to the cutting operation to clear excess molten metal and debris from the kerf thereby increasing the efficiency of the piercing and shortening the cycle time.

13 Claims, 4 Drawing Sheets

(51) Int. Cl.
*B23K 26/382* (2014.01)
*B23K 26/12* (2014.01)
*B23K 26/38* (2014.01)

(52) U.S. Cl.
CPC ........ *B23K 26/147* (2013.01); *B23K 26/1464* (2013.01); *B23K 26/38* (2013.01); *B23K 26/382* (2015.10)

(58) Field of Classification Search
CPC ............... B23K 26/1476; B23K 26/38; B23K 2103/50; B23K 26/1494; B23K 26/389; B23K 26/40; B23K 2103/04; B23K 26/04; B23K 26/0622; B23K 26/0626; B23K 26/0643; B23K 26/0648; B23K 26/0665; B23K 26/125; B23K 26/1435; B23K 26/1438; B23K 26/146; B23K 26/361; B23K 26/12; H01S 3/025; H01S 3/0407; H01S 3/061; H01S 3/0615; H01S 3/07; H01S 3/0805; H01S 3/08072; H01S 606/13; B23Q 39/02; Y10T 29/49274; Y10T 29/51; Y10T 29/5109; Y10T 29/5114

See application file for complete search history.

(56) References Cited

U.S. PATENT DOCUMENTS

2011/0114610 A1   5/2011   Szelagowski
2015/0224600 A1*  8/2015   Spiess ................. B23K 26/032
                                                  219/121.72

FOREIGN PATENT DOCUMENTS

EP          1145796 A1   10/2001
JP        H10225787 A    8/1998

* cited by examiner

DUAL GAS PIERCE USING COAXIAL AND DIRECTIONAL ASSIST

CROSS-REFERENCE TO RELATED APPLICATIONS

This application is a continuation of U.S. patent application Ser. No. 15/792,207, filed Oct. 24, 2017, which is related to and claims priority from earlier filed U.S. Provisional Patent Application No. 62/412,403, filed Oct. 25, 2016.

BACKGROUND OF THE INVENTION

The present invention relates generally to a method and system for gas assisted laser cutting of thick metal sections. More specifically, the present invention relates to a method and system utilizing both coaxial and directional gas directed via a laser cutting nozzle to enhance cutting and piercing of thick metal sections.

The operation of cutting thick metal sections (such as steel sections having a thickness of 6 mm or greater) by laser, usually requires a piercing operation that first creates an opening in the metal which subsequently transitions to the intended cutting operation. Generally, the piercing operation involves the application of a high energy laser beam from a cutting nozzle to plunge an initial hole into the metal plate, heating the plate, and at the same time, supplying an assist gas which is coaxial to the laser beam, in order to form the piercing hole by removing the molten metal from the heated part of the plate by the kinetic energy of the assist gas. When implementing the piercing operation, part of the molten metal debris accumulates around the piercing hole and is scattered around the piercing hole and upwards into the laser cutting nozzle.

Typically, the assist gas is pressurized oxygen, which is applied through the cutting nozzle via coaxial ports adjacent the laser optic. The application of oxygen gas during the piercing operation enhances the piercing operation by increasing the efficiency of the cutting operation. This results because increased energy is obtained as a result of the oxidation of the molten material by the flow of the oxygen gas.

The problem with this operation is that the overall plate cutting cycle times are extended when operating with such a single gas system, as the oxidized metal debris expelled from the cut using the oxygen is deposited on the bottom face of the plate in the form of a hardened dross deposit. To address the buildup of dross on the bottom of the plate, the prior art typically requires an increase in the laser power applied for the cut and an increased cycle time. However, this in turn results in an increased diameter in the piercing hole, an increase in the molten metal being blown from the cut that can clog the kerf and damage the focusing lens of the laser cutting tool. As a result, incomplete cutting can be produced when the intended cutting step commences.

In view of the problems previously encountered, attempts have been made to execute the piercing operation at high speed by raising the peak output of the pulse of the laser beam. However, even at the increased speed and power output the problem of the adhesion of sputter to the lens and nozzle still exists and no basic solution has been found for this problem.

While a number of other attempts have been made to prevent the blowing away of molten metal and adhering of sputter by controlling the laser beam output during the piercing operation, but the piercing speed follows the control speed, and there are limits to which the speed can be increased.

Due to the above described issues, it is unavoidable that the piercing operation requires an extended cycle time when cutting thick plate in particular. Furthermore, it is difficult to create a piercing hole that has an intended shape. In order to ensure the passage of the assist gas and the removal of molten metal when switching from piercing to cutting, as well as stabilize the cut at the beginning of the cutting, it is desirable that the cross section and the inner surface of the piercing hole be a perfect circle having a diameter close to the external shape of the laser beam and be smoothly formed. However, in the traditional piercing operation, when piercing a thick plate, the depth of material makes the removal of molten metal from the piercing hole particularly difficult. As a result, there are many cases in which the diameter of the piercing hole may become extremely large and the shape of the cross section becomes distorted.

Further, due to the adhering of dross, the inner surface of the cut, along the thickness of the material, becomes extremely irregular. Thus, when switching from piercing to cutting, the probability of producing an incomplete cut becomes even higher.

In addition, there is an increase in self burning of the material being cut at the commencement of the cutting, causing the kerf to become unstable.

Still further, as the piercing time becomes long, the amount of heat input into the cut work becomes large causing the cut work to reach a high temperature, thereby causing excessive melting when switching from piercing to cutting, again increasing the probability of producing an incomplete cut.

In this manner, in the piercing operation for a thick plate, because it is difficult to obtain the intended shape of the piercing hole, because the cut work is heated to a high temperature due to the long piercing time thereby making excessive melting easily produced, the problems arise that incomplete cutting is easily produced, the cut at the commencement of cutting is unstable, and safely obtaining a high quality cut is not possible. As a result, if the molten metal produced during the piercing operation is not smoothly removed, there may be a great increase in melting because the piercing operation time becomes lengthened, and in addition to this becoming a vicious cycle, influences the cutting operation which follows the piercing operation.

There is therefore a need for a method and system that allows a controlled piercing in thick plate material with a rapid transition to a cutting operation to reduce the overall cycle time in a thick plate cut. There is also a need for a cutting nozzle that can reliably allow a rapid piercing operation with an immediate transition to a cutting operation where a high quality cut can be obtained even in thick plate material.

BRIEF SUMMARY OF THE INVENTION

In this regard, the present invention provides a method and system for laser piercing of thick plate material that allows for rapid transition to a cutting operation that can reliably produce a piercing hole and complete a cutting operation of the intended shape in a short time, while improving the cutting quality of the cutting after switching from the piercing operation.

The cutting nozzle of the present invention will be discussed in detail when the illustrated figures are discussed below. The nozzle has a centrally located laser directed by optics for the performing of the piercing and cutting operation. The piercing operation applies a laser beam to the cut work while discharging and supplying towards the cut work pure oxygen gas, which is discharged coaxially to the laser beam and is applied towards the cutting work.

Additionally, a direction controlled nozzle adjacent the main cutting port provides a discharge of high pressure compressed air non-axially relative to the cutting operation that clears the excess molten metal and debris from the kerf forming the cut allowing the smooth removal of molten metal thereby increasing the efficiency of the piercing and shortening the cycle time. The prevention of excess melting and the smooth removal of molten metal make possible using a continuous oscillation, high output laser beam, the piercing time can be greatly shortened. Furthermore, by the prevention of excess melting and the smooth removal of molten metal, a piercing hole of the intended shape can be reliably obtained.

While prior art technology has been proposed wherein the piercing hole is formed while oxygen gas is supplied and discharged coaxially with the laser beam to the position of application of the laser beam on the cut work, curtain gas is also provided coaxially the effective clearing of the molten metal is simply not achieved because much if it remains trapped within the kerf of the cut.

The laser piercing method of the present invention is executed before the laser cutting step, and is characterized in discharging and supplying towards this cut work a highly pure oxygen gas coaxially with the laser beam applied to the cut work, and at the same time, applying oblique to the cut work a high pressure clearing stream of compressed air from an adjacent gas nozzle positioned adjacent the main cutting nozzle.

In this method, because the clearing stream of compressed air can be directed across the laser beam and the cut work, the molten metal, sputter, etc., in the vicinity of the position of the application of the laser beam can be blown away, and thereby removed with high efficiency. Even if the piercing hole is deep, since the piercing hole is formed while the molten metal is removed from inside the piercing hole with high efficiency, there is no influence of dross, etc., and a piercing hole of the intended shape can be formed even, for example, when a piercing hole is formed in a plate (steel plate) having a thickness exceeding 12 mm.

It is an object of the present invention to provide a method and system that allows a controlled piercing in thick plate material with a rapid transition to a cutting operation to reduce the overall cycle time in a thick plate cut. It is a further object of the present invention to provide a cutting nozzle that can reliably allow a rapid piercing operation with an immediate transition to a cutting operation where a high quality cut can be obtained even in thick plate material These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
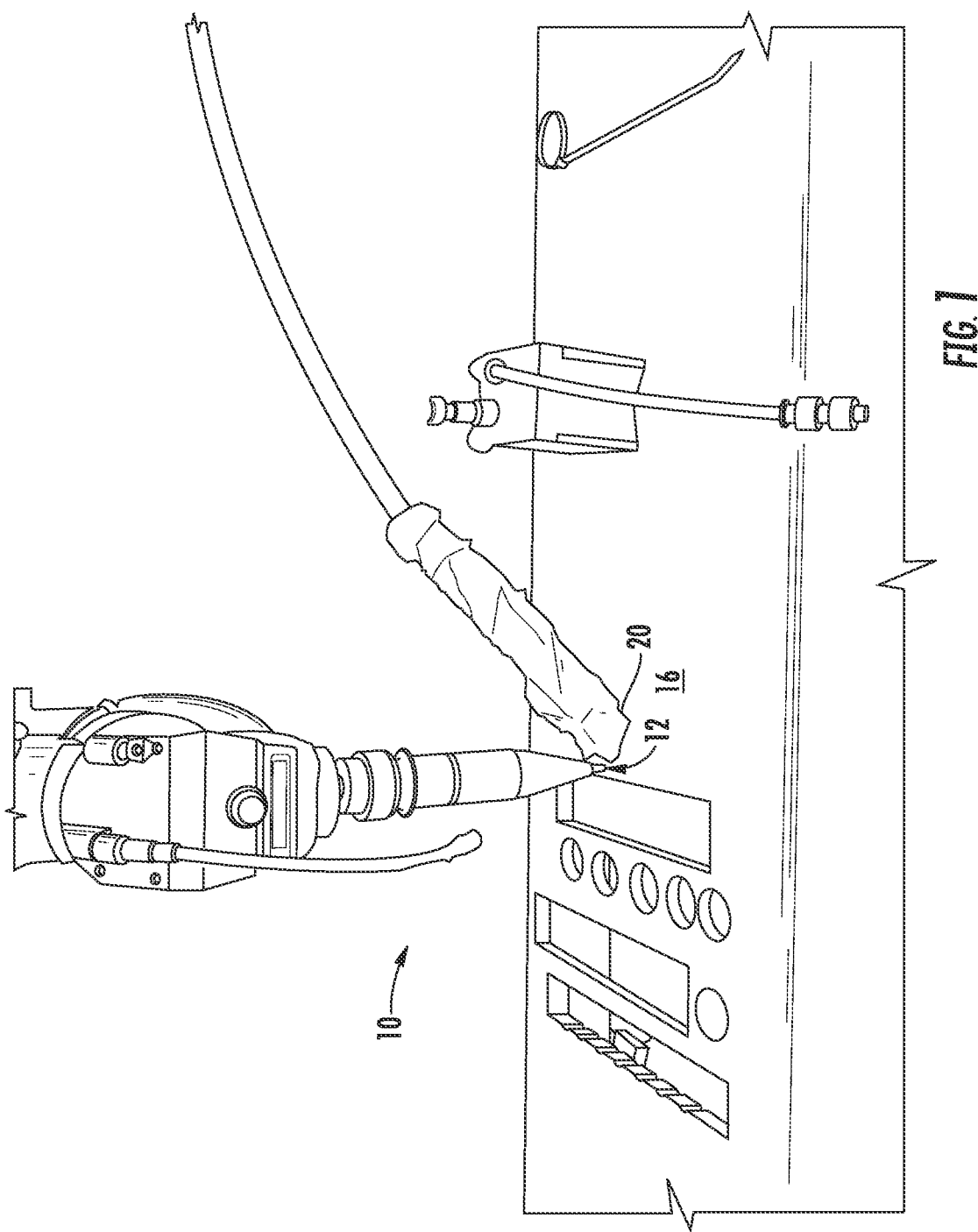
FIG. 1 is a front view of a laser cutting head disclosed in the present invention.

Now referring to the drawings, a system and method is shown and generally illustrated in the figures. As can be seen the principal component of the method and system of the present invention is a laser cutting module for piercing of thick plate material that allows for rapid transition to a cutting operation that can reliably produce a piercing hole and complete a cutting operation of the intended shape in a short time, while improving the cutting quality of the cutting after switching from the piercing operation.

Figure 2:
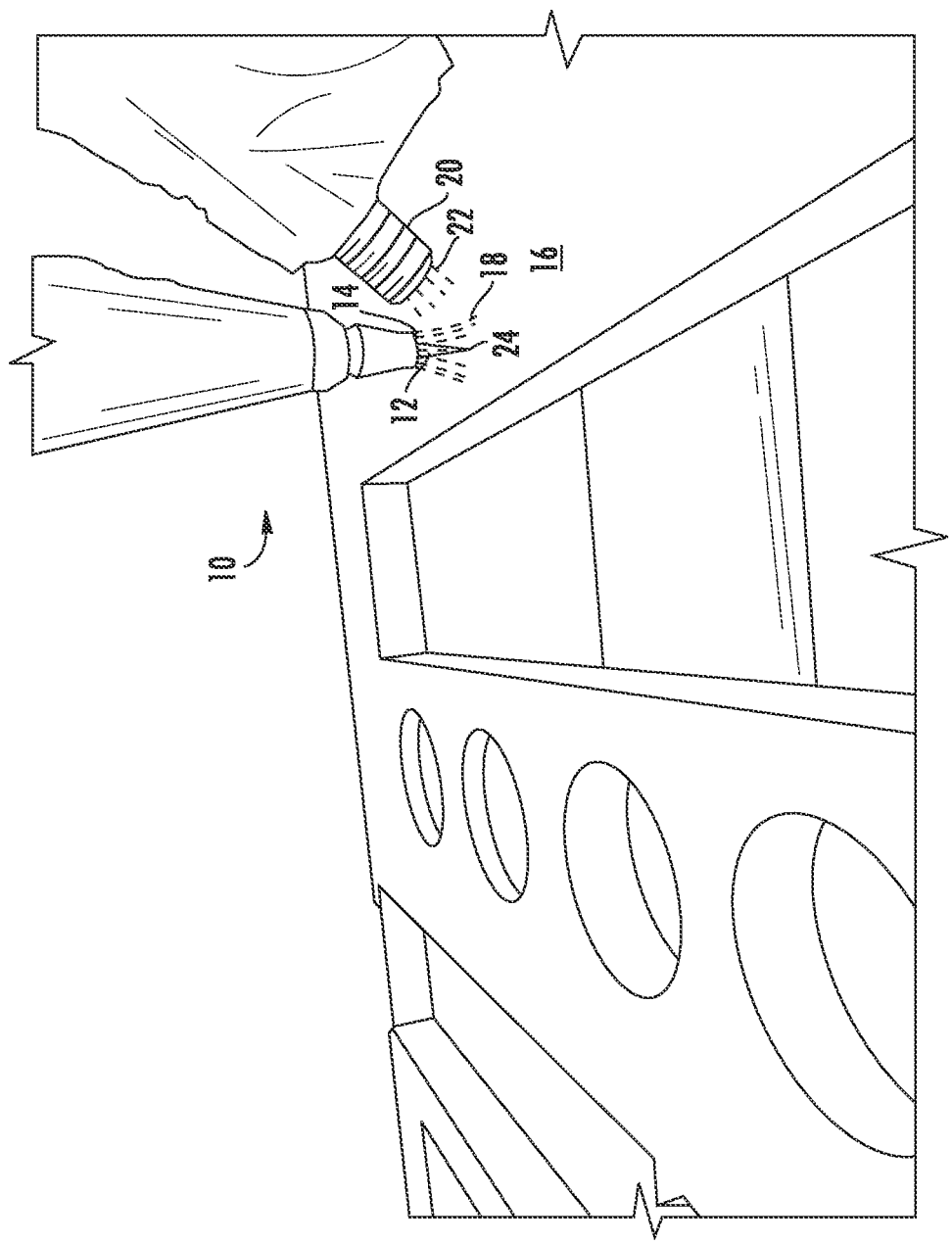
FIG. 2 is a close up view of the cutting nozzle of the present invention.
Figure 3:
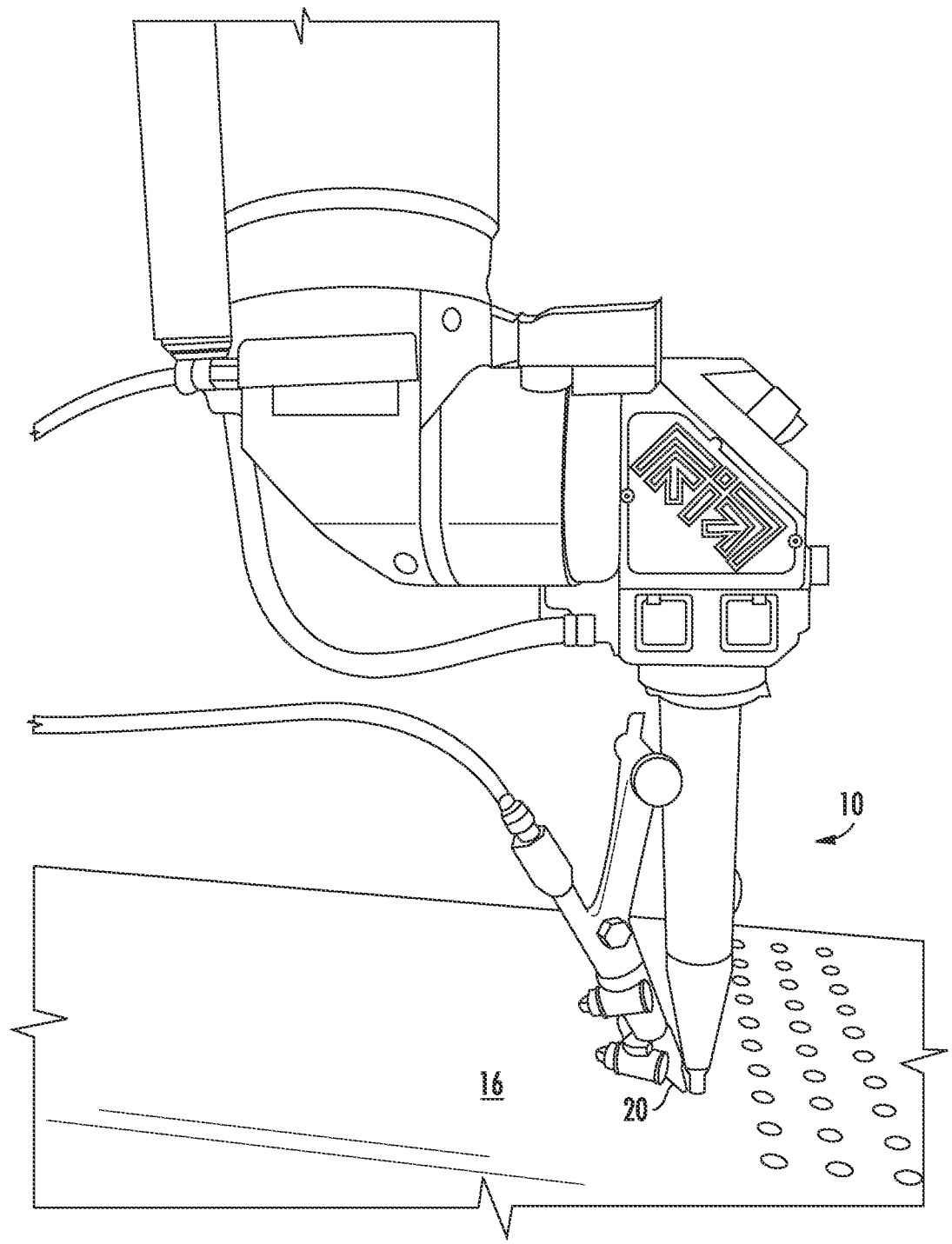
FIG. 3 is a side view of the laser cutting nozzle.

Turning now to FIGS. 1, 2 and 3, the cutting nozzle 10 of the present invention has a centrally located laser 12 directed by optics 14 for the performing of the piercing and cutting operation. Prior to the commencement of the cutting operation an initial hole needs to be formed through the work material 16. The piercing operation applies a laser beam 12 to the work material 16 to be cut. In addition, the cutting nozzle also supplies and discharges pure oxygen 18 towards the work material to be cut. It is preferable that the oxygen is discharged coaxially in a substantially parallel relation to the directional discharge of the laser beam 12 as both are applied towards the cutting work 16.

Additionally, a direction controlled nozzle 20 that is positioned adjacent the main cutting nozzle provides a second discharge of high pressure compressed air 22 that is directed non-axially relative to the directional discharge of the laser beam and the cutting operation. The high pressure compressed air 22 directed from the direction controlled nozzle 20 clears the molten metal and debris from the kerf 24 being formed by the cutting operation. This allows the smooth removal of molten metal from the cut thereby increasing the efficiency of the piercing, greatly reducing the formation of dross on the rear of the cut material and shortening the cycle time.

Further, as the piercing operation and transition to cutting operation cycle is shortened, there is a great reduction in excess melting which further facilitates the smooth removal of molten metal. This makes it possible to use continuous oscillation and a high output laser beam that allows the piercing time to be greatly shortened. Furthermore, by the prevention of excess melting and the smooth removal of molten metal, a piercing hole of the intended shape can be reliably obtained.

While prior art technology has been proposed wherein the piercing hole is formed while oxygen gas is supplied and discharged coaxially with the laser beam to the position of application of the laser beam on the cut work, curtain gas is also provided coaxially the effective clearing of the molten metal is simply not achieved because much if it remains trapped within the kerf of the cut or within the curtain gas.

Figure 4:
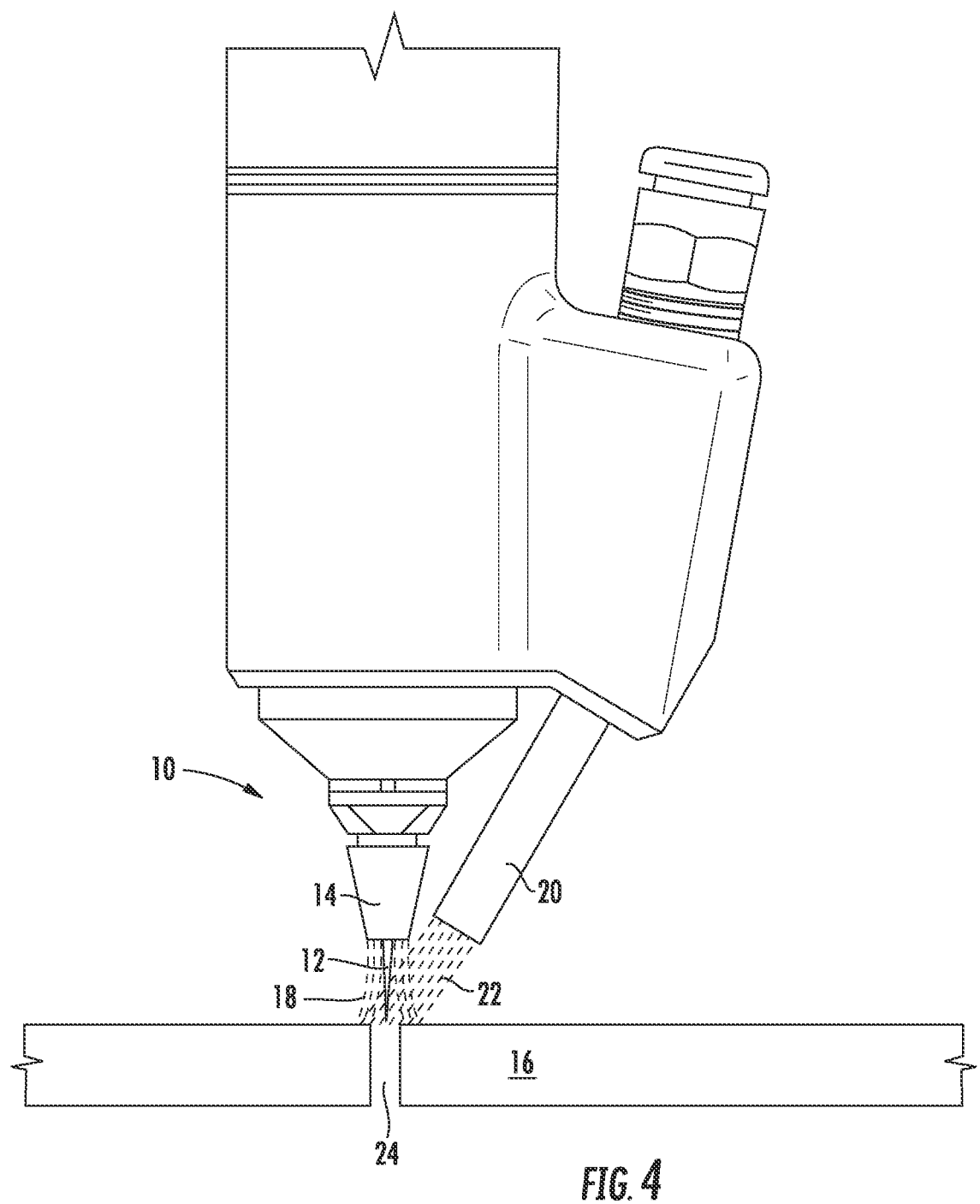
FIG. 4 is a sketch illustrating the laser cutting head in operation.

Turning now to FIG. 4, the first step in the cutting method of the present invention is to first execute a laser piercing operation which is executed before the laser cutting step.

The piercing step is characterized in discharging and supplying towards this cut work a highly pure oxygen gas coaxially and substantially parallel with the laser beam applied to the cut work. Simultaneously, oblique to the cut work, a high pressure clearing stream of a second assist gas is applied from the direction controlled nozzle positioned adjacent the main cutting nozzle.

In this method, because the clearing stream of a second assist gas can be directed across the laser beam and the cut work, the molten metal, sputter, etc., in the vicinity of the position of the application of the laser beam can be blown away, and thereby removed with high efficiency. Even if the piercing hole is deep, since the piercing hole is formed while the molten metal is removed from inside the piercing hole with high efficiency, there is no influence of dross, etc., and a piercing hole of the intended shape can be formed even, for example, when a piercing hole is formed in a plate (steel plate) having a thickness exceeding 12 mm.

Once the piercing hole is formed the system can transition directly to the cutting operation without concern that the adjacent material has been overheated or subject to excess melting. In the cutting operation the kerf can therefore be reduced because there is a great reduction in the dross and sputter being formed.

Additionally, it can be seen that since the second assist gas being fed from the direction controlled nozzle flows at an oblique angle relative to the work piece and the main laser cutting nozzle, the sputter is all directed away from the main cutting nozzle rather than being blown directly back at the nozzle as it splashed off the work piece and out of the kerf. This greatly reduces damage to the optics used for controlling and directing the laser cutting beam.

It can therefore be seen that the present invention provides a method and system that allows a controlled piercing in thick plate material with a rapid transition to a cutting operation to reduce the overall cycle time in a thick plate cut. It can also be seen that the present invention to provides a cutting nozzle that can reliably allow a rapid piercing operation with an immediate transition to a cutting operation where a high quality cut can be obtained even in thick plate material. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A laser cutting system comprising:
   a laser beam directed via optics in a first direction, said laser beam executing a piercing operation using high power continuous oscillation and transitioning to a cutting operation;
   a first nozzle for directing a first assist gas substantially parallel to said first direction during said piercing operation and said cutting operation; and
   a second directionally controlled nozzle for directing a second assist gas into a kerf formed in a material being cut and at an angle relative to said first direction such that byproduct from said piercing and cutting operations are directed away from said optics and said kerf.

2. The laser cutting system of claim 1, wherein said first nozzle is positioned concentrically to said laser beam and said second nozzle is positioned adjacent to said first nozzle and said laser beam.

3. The laser cutting system of claim 1, wherein said first assist gas is an oxidizing agent.

4. The laser cutting system of claim 1, wherein said first assist gas is high purity oxygen.

5. The laser cutting system of claim 1, wherein said second assist gas is compressed air.

6. The laser cutting system of claim 1, wherein said angle of said second assist gas is oblique relative to said first direction such that byproduct from said cutting operation is directed away from said optics and a kerf formed in a material being cut.

7. A laser cutting method comprising:
   piercing a cut work by supplying simultaneously a laser beam directed via optics using high power continuous oscillation, a first assist gas from a first nozzle substantially parallel to said laser beam, and a second assist gas from a second direction control nozzle positioned adjacent and at an angle relative to said first nozzle, said second direction control nozzle directing said second assist gas into a kerf formed in said cut work; and
   cutting said cut work pierced by means of said laser beam by moving said laser beam and said first and second nozzles with respect to said cut work, while supplying simultaneously said laser beam transitioning to a cutting operation, said first assist gas, and said second assist gas to said cut work from said laser processing nozzle.

8. The laser cutting method of claim 7, wherein said first nozzle is positioned concentrically to said laser beam.

9. The laser cutting method of claim 7, wherein said first assist gas is an oxidizing agent.

10. The laser cutting method of claim 7, wherein said first assist gas is high purity oxygen.

11. The laser cutting method of claim 7, wherein said second assist gas is compressed air.

12. The laser cutting method of claim 7, wherein said angle of said second assist gas is oblique relative to said first direction such that byproduct from said cutting operation is directed away from said optics and a kerf formed in a material being cut.

13. The laser cutting method of claim 7, wherein said laser beam is supplied to said cut work from said inner gas nozzle, said first assist gas is supplied from said inner gas nozzle coaxially with the laser beam to said cut work, said second assist gas is supplied from said direction controlled nozzle in a direction inclined relative to said laser beam and said cut work.

* * * * *